United States Patent Office 3,054,924
Patented Sept. 18, 1962

3,054,924
POSITION CONTROL APPARATUS
Joachim Wetzger, Berlin, Friedrich-Wilhelm Neumann, Berlin-Hermsdorf, and Alfred Wiesner, Berlin-Wilmersdorf, Germany, assignors to Siemens-Schuckertwerke Aktiengesellschaft, Erlangen, Germany, a corporation of Germany
Filed Mar. 17, 1959, Ser. No. 799,921
Claims priority, application Germany Mar. 28, 1958
10 Claims. (Cl. 314—71)

In the machining or shaping of a metallic workpiece by the electro-erosive method, an electrode or workmember must be closely positioned adjacent to the workpiece. In order to obtain the desired workpiece shaping in a relatively short time, it is necessary to accurately maintain the space or relative distance between the workpiece and the electrode in the order of from $1/100$ to $1/10$ millimeter.

It has already been proposed to adjust the position of the electrode relative to the workpiece or vice versa, as required by the consumption of the electrode, by means of electric motors which, for example, are supplied from a direct current power supply and are directly controlled in dependence upon the electrical operating voltage across the erosive spark gap between the electrode and the workpiece.

It is an object of the present invention to provide improved control apparatus by means of which the space between the electrode and the workpiece can be better maintained substantially constant in accordance with a predetermined reference value in a more simple, reliable and quick manner and with a higher degree of accuracy, even if said space is extremely small.

According to the invention this object is attained, for example, in connection with D.C. drives for the electrode feed, by regulating the armature voltage of an electric feed motor in dependence upon the operating voltage between the electrode and the workpiece with respect to the speed and the direction of rotation of said feed motor by means of a single stage and/or multistage transistor amplifier. For this purpose a predetermined and preset reference voltage is compared with the respective operating voltage across the electro-erosive spark gap, said preset reference voltage being proportional to the desired spacing of the electrode from the workpiece. The voltage difference between the reference voltage and the operating voltage is applied to the control circuit of the transistor amplifier.

Figure 1:
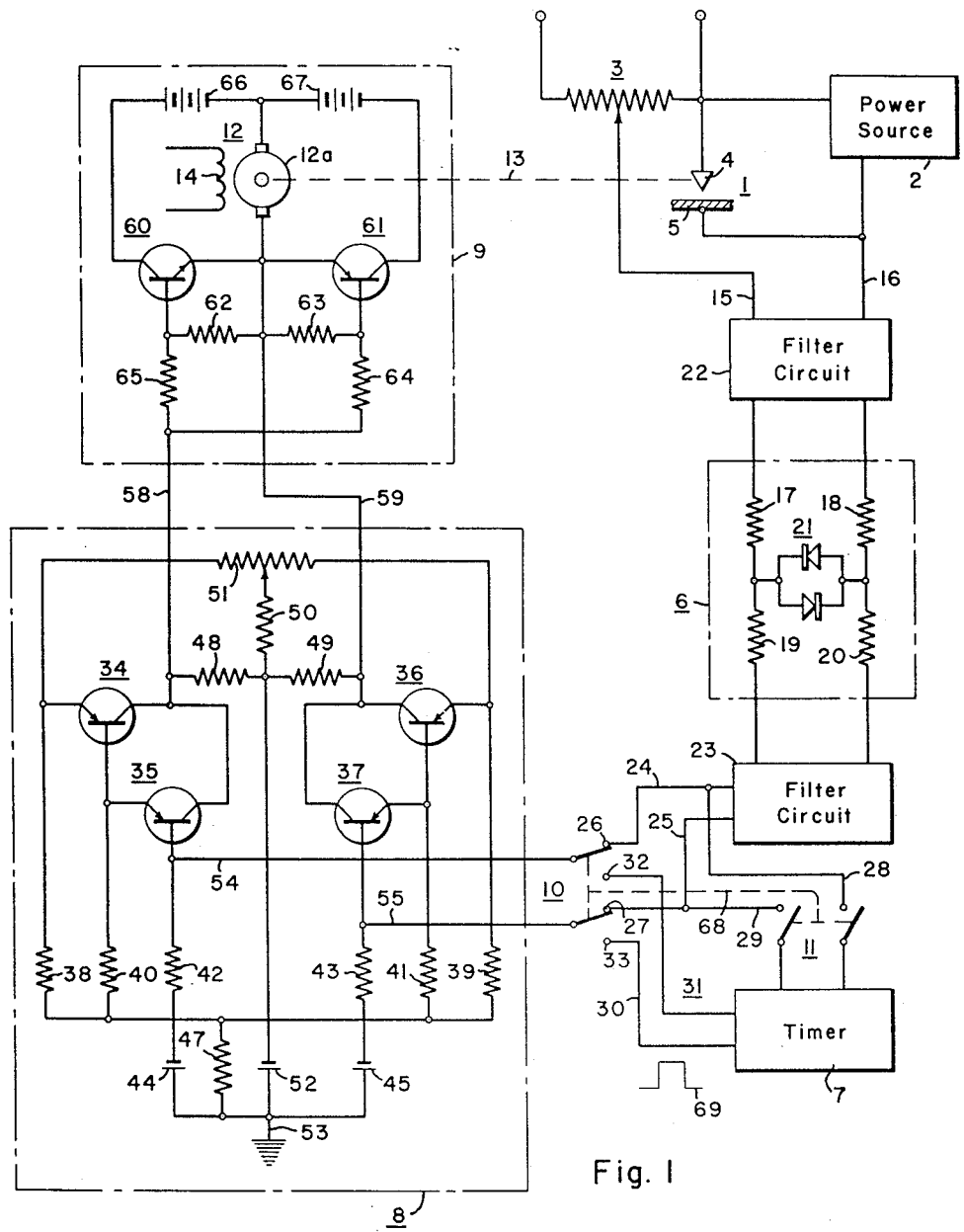
Figure 2:
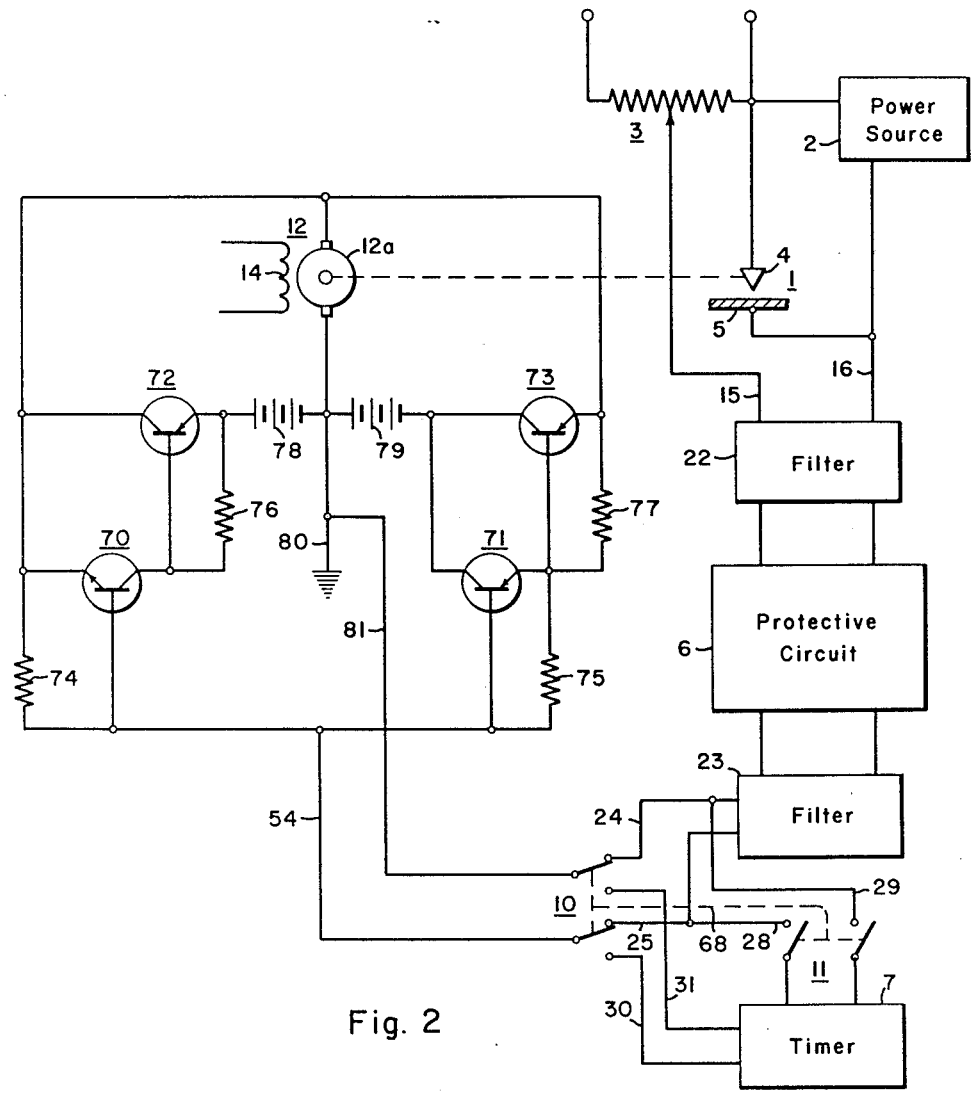

A first embodiment of the present invention is schematically shown in FIG. 1 and a second embodiment is shown in FIGURE 2 of the accompanying drawings.

The spark gap 1 in FIG. 1 which has the actual voltage applied thereacross, is supplied, for example, with direct current by a spark generator or other suitable power source 2. A potentiometer 3 is provided for setting up the direct current reference voltage, and according to the value of which the relative spacing of the electrode 4 from the workpiece 5 is automatically determined and controlled. The transistor amplifier shown in FIG. 1 includes a protective circuit 6, a timer 7, a transistor amplifier stage 8 and two change-over switches 10 and 11. The driving motor 12 serves to adjust the position of the electrode 4, as indicated by the connection 13, said motor having an excitation field winding 14.

In the illustrated control apparatus the protective circuit 6 has applied thereto the reference or desired position voltage through the conductor 15, and the actual position voltage through conductor 16. The protective circuit 6 functions to protect the transistors of the amplifier device 8 from voltages which could damage said transistors, and it consists of four resistors 17, 18, 19 and 20 and the rectifier circuit 21 including predetermined voltage breakdown diodes connected as well known in this art. Furthermore, there are provided filter circuits 22 and 23 connected respectively ahead of and after the protective circuit 6. Suitable filter circuits are very well known in this art and, therefore, are not shown in detail. The filter circuit 22 connected ahead of the protective circuit 6 is operative such that faults are prevented from reaching the protective circuit 6. The filter circuit 23 is connected through conductors 24 and 25 to the contacts 26 and 27 of the switch 10, and through conductors 28 and 29 to the switch 11. The timer 7 which may be provided with one or a plurality of RC time-circuits as well known, is connected to the contacts 32 and 33 of switch 10 through conductors 30 and 31.

The amplifier stage 8 includes four transistors 34, 35, 36 and 37. Resistors 38 and 39 are connected to the emitter elements of transistors 34 and 36, and resistors 40 and 41 are connected between the emitter elements and base elements of the same transistors. Said resistors 40 and 41 have a dual function in that they are not only emitter-base resistors for the transistors 34 and 36 but also emitter resistors for the transistors 35 and 37. The emitter-base resistors 42 and 43 for the transistors 35 and 37 are electrically connected to batteries 44 and 45 which provide a negative bias. The positive terminals of said batteries are connected through a resistor 47 whose other side is electrically connected to the resistors 38 and 41. The resistor 47 operates as a series resistor for the emitter circuit of each of the transistors. There are also provided three collector resistors 48, 49 and 50 for balancing the collector currents. A resistor 51 has one side connected to the emitter element of the transistor 34, and its other side connected to the emitter element of transistor 36. Its function is to balance the emitter currents of these two transistors 34 and 36. A voltage source such as a battery 52 has its negative terminal connected to the three resistors 48 to 50 and its positive terminal connected to the positive terminals of batteries 44 and 45 and to the resistor 47. The positive terminals of all three voltage sources 44, 45 and 52 are grounded by conductor 53. The amplifier 8 is electrically connected to switch 10 through conductors 54 and 55.

The output conductors 58 and 59 of the amplifier 8 are connected to the output stage 9. The output stage comprises two transistors 60 and 61 of different types as shown. Associated with these transistors are emitter-base resistors 62 and 63 as well as balancing resistors 64 and 65. Two batteries 66 and 67 furnish the collector-emitter voltage for the respective transistors 60 and 61 of the output stage 9 in the same manner as does battery 52 with respect to the transistors of the input or amplifier stage 8. The driving motor 12 for the movable electrode 4 has an excitation field winding 14 and an armature 12a. The armature circuit is connected into the circuits including the transistors 60 and 61 and the batteries 66 and 67.

The mode of operation of the present control apparatus as shown in FIGURE 1 and described above is as follows:

Assuming the switch 10 is in the position as shown, the transistor amplifier 8 is directly connected through the filter circuits 22 and 23 and protective circuit 6 to the lines 15 and 16 to which the reference voltage and the actual voltage respectively are applied. This results in an operation controlling scheme for the driving motor 12 connected to the electrode 4 and which operates with a relatively low power.

In many instances it is necessary, however, to increase this power. In order to do so the transistors are connected to operate no longer in the normal mode of a common-emitter connection, but in the instantaneous or switching mode. For this purpose the switch member 10 is moved from contacts 26, 27 to contacts 32, 33, and, at the same time, switch member 11 is closed so that the voltages, namely the reference voltage and the actual voltage, will be applied to the amplifier stage 8 through a timer 7 including an RC timing circuit. Switch members 10 and 11 are mechanically coupled together as indicated by the broken line 68. The timer 7 supplies a rectangular voltage pulse for each of the reference voltage and the actual voltage and having a time duration dependent upon the magnitude of the respective applied voltages, which pulses control the switching of the transistors or their instantaneous mode of operation causing the transistors 35 and 37 to change from a fully conductive state to a nonconductive state. The rectangular voltage pulse form is indicated at 69.

An essential feature of the present control apparatus is the use of two different type transistors 60 and 61 whereby a push-pull operation is provided which is of particular advantage as thereby the motor 12 can be connected for rotation in one of a forward or reverse direction, dependent upon whether transistor 60 or 61 is conducting.

A modification of the present control apparatus can be achieved by connecting the different type transistors 70 and 71 as shown in FIG. 2. The transistors 70 and 71 are of different types namely NPN and PNP, whereas the transistors 72 and 73 are similar PNP junction transistors. A base-emitter resistance is shown at 74, and a base-emitter resistor is shown at 75 for the respective transistors 70 and 71. Base-emitter resistors 76 and 77 are provided respectively for the transistors 72 and 73. The two batteries 78 and 79 supply the operation voltage or collector-emitter voltage respectively for each of the four transistors. Connection to ground potential is established through conductors 80 and 81 respectively, conductor 80 being connected to the center point of the two voltage sources 78 and 79, and conductor 81 being connected to establish the ground potential in accordance with one contact of switch member 10. A particular advantage of this arrangement resides in that the complementary or different type transistors 70 and 71 may be smaller than is required for the control apparatus modification shown in FIG. 1, because in the amplifier stage formed by these two transistors as shown in FIG. 2, smaller power is handled than in the arrangement shown in FIG. 1.

The operation with the timer 7 permits considerably higher efficiency than is obtainable without a timer. If, for example, it is possible to obtain a power of about 16 watts without a timer, the power obtained upon operation with a timer will be about 80 to 100 watts, that is, practically five times the former mentioned value.

We claim as our invention:

1. In apparatus for controlling the relative spacing between a workmember and a workpiece, the combination of a source of a first reference voltage signal having a value in accordance with a desired reference spacing between said workmember and said workpiece, a source of a second voltage signal having a value in accordance with the actual spacing between said workmember and said workpiece, a motor member operatively connected to one of said workmember and said workpiece for controlling the relative spacing between said workmember and said workpiece, a voltage comparison device operatively connected to said motor member and having first and second control members responsive to said first and second voltage signals such that said first control member causes said motor member to vary the spacing between said workmember and said workpiece in a first direction when said first voltage signal has a greater value than said second voltage signal and said second control member causes said motor member to vary the spacing between said workmember and said workpiece in a second direction when said second voltage signal has a greater value than said first voltage signal.

2. In apparatus for controlling the position of a workmember relative to a workpiece, the combination of a source of a first reference voltage signal having a value in accordance with a desired reference position for said workmember relative to said workpiece, a source of a second voltage signal having a value in accordance with the actual position of said workmember relative to said workpiece, a motor member operatively connected to said workmember for controlling the position of said workmember, a voltage comparison device operatively connected to said motor member and having a first and second control member responsive to each of said first and second voltage signals such that said first control member causes said motor member to move said workmember in a first direction when said first voltage signal has a greater value than said second voltage signal and said second control member causes said motor member to move said workmember in a second direction when said second voltage signal has a greater value than said first voltage signal.

3. In apparatus for controlling the relative spacing between a workmember and a workpiece member, the combination of a source of a first reference voltage signal having a value in accordance with the desired reference spacing between said workmember and said workpiece member, a source of a second voltage signal having a value in accordance with the actual spacing between said workmember and said workpiece member, a motor member operatively connected to one of said workmember and said workpiece member for controlling the position of said one member, a voltage comparison device operatively connected to said motor member and including first and second transistor devices, which said first transistor device being of a different type than the second transistor device, said first and second transistor devices being responsive to said first and second control voltage signals such that said first transistor device causes said motor member to move said one member in a first direction when said first voltage signal has a greater value than said second voltage signal and said second transistor switching device causes said one member to be moved by said motor member in a second direction when said second voltage signal has a greater value than said first voltage signal.

4. In apparatus for controlling the position of a workmember relative to a workpiece, the combination of a source of a first reference voltage signal having a value in accordance with the desired reference position for said workmember relative to said workpiece, a source of a second voltage signal having a value in accordance with the actual position of said workmember relative to said workpiece, a motor member operatively connected to one of said workmember and said workpiece for controlling the position of said workmember relative to said workpiece, a voltage comparison device operatively connected to said motor member and including first and second transistor switching devices, which said first transistor device being of a different type than the second transistor device, said first and second transistor devices being responsive to said first and second control voltage signals such that said first transistor switching device causes said motor member to move said one of said workmember and said workpiece in a first direction when said first voltage signal has a greater value than said second voltage signal and said second transistor switching device causes said one of the workmember and said workpiece to be moved by said motor member in a second direction when said second voltage signal has a greater value than said first voltage signal.

5. In apparatus for controlling the relative spacing between a workmember and a workpiece member, the combination of a source of a first reference voltage signal having a value in accordance with the desired spacing between said workmember and said workpiece member, a source of a second voltage signal having a value in accordance with the actual spacing between said workmember and said workpiece member, with said source of a second voltage signal including the voltage drop between said workmember and said workpiece member and having a value dependent upon the spacing between said workmember and said workpiece member, a motor member operatively connected to one of said workpiece member and said workmember for controlling the position of said one member, a voltage comparison device operatively connected to said motor member and having first and second control members responsive to said first and second voltage signal such that said first control member causes said motor member to move said one member in a first direction when said first voltage signal has a greater value than said second voltage signal and said second control member causes said motor member to move said one member in a second direction when said second voltage signal has a greater value than said first voltage signal.

6. In apparatus for controlling the position of a workmember relative to a workpiece, the combination of a source of a first reference voltage signal having a value in accordance with the desired reference position for said workmember relative to said workpiece, a source of a second voltage signal having a value in accordance with the actual position of said workmember relative to said workpiece, with said source of a second voltage signal including the voltage drop between said workmember and said workpiece and having a value dependent upon the distance between said workmember and said workpiece, a motor member operatively connected to said workmember for controlling the position of said workmember, a voltage comparison device operatively connected to said motor member and having first and second control members responsive to said first and second voltage signal for controlling said voltage drop by said first control member causing said motor member to move said workmember in a first direction when said first voltage signal has a greater value than said second voltage signal and said second control member causing said motor member to move said workmember in a second direction when said second voltage signal has a greater value than said first voltage signal.

7. In apparatus for controlling the relative spacing between a workmember and a workpiece member, the combination of a source of a first reference voltage signal having a value in accordance with a desired reference spacing between said workmember and said workpiece member, a source of a second voltage signal having a value in accordance with the actual spacing between said workmember and said workpiece member, a motor member operatively connected to one of said workmember and said workpiece member for controlling the position of said one member, a timing device responsive to at least one of said first and second voltage signals for providing a pulse signal having a time duration in accordance with the value of said one voltage signal, a voltage comparison device operatively connected to said motor member and including first and second control members responsive to at least said pulse signal for causing said motor member to move said one member by an amount in accordance with the time duration of said pulse signal.

8. In apparatus for controlling the position of a workmember relative to a workpiece, the combination of a source of a first reference voltage signal having a value in accordance with a desired reference position of said workmember relative to said workpiece, a source of a second voltage signal having a value in accordance with the actual position of said workmember relative to said workpiece, a motor member operatively connected to said workmember for controlling the position of said workmember, a timing device responsive to said first and second voltage signals for providing at least one pulse signal having a time duration in accordance with the value of at least one of said voltage signals, a voltage comparison device operatively connected to said motor member and including first and second control members responsive to at least said pulse signal for causing said motor member to move said workmember by an amount in accordance with the time duration of at least said pulse signal.

9. In apparatus for controlling the relative spacing between a workmember relative to a workpiece member, the combination of a source of a first reference voltage signal having a value in accordance with a desired reference spacing between said workmember relative to said workpiece member, a source of a second voltage signal having a value in accordance with the actual spacing between said workmember relative to said workpiece, a motor member operatively connected to one of said workmember and said workpiece member for controlling the position of said one member, a timing device responsive to said first and second voltage signals for providing first and second control pulse signals respectively having a time duration in accordance with the value of said first and second voltage signals, a voltage comparison device operatively connected to said motor member and including first and second transistor devices responsive to the difference between said first and second pulse signals for causing said motor member to move said one member by an amount in accordance with the difference in the time duration of said first pulse signal as compared to the time duration of the second pulse signal.

10. In apparatus for controlling the position of a workmember relative to a workpiece, the combination of a source of a first reference voltage signal having a value in accordance with a desired reference position for said workmember relative to said workpiece, a source of a second voltage signal having a value in accordance with the actual position of said workmember relative to said workpiece, a motor member operatively connected to said workmember for controlling the position of said workmember, a timing device responsive to said first and second voltage signals for providing first and second control pulse signals respectively having time durations in accordance with the value of said first and second voltage signal, a voltage comparison device operatively connected to said motor member and including first and second transistor devices responsive to each of said first and second pulse signals for causing said motor member to move said workmember relative to said workpiece by an amount in accordance with the difference in the time duration of said first pulse signal as compared to the time duration of the second pulse signal.

References Cited in the file of this patent
UNITED STATES PATENTS

| | | |
|---|---|---|
| 2,047,988 | Wittkuhns et al. | July 21, 1936 |
| 2,147,674 | Satterlee | Feb. 21, 1939 |
| 2,329,127 | Levy | Sept. 7, 1943 |
| 2,789,244 | Carlson | Apr. 16, 1957 |
| 2,823,331 | Bichsel et al. | Feb. 11, 1958 |